No. 890,295. PATENTED JUNE 9, 1908.
E. McCOY.
LUBRICATOR.
APPLICATION FILED MAR. 11, 1907.

WITNESSES:
Anna M. Dow.
Joseph A. Noelke

INVENTOR:
Elijah McCoy
By Barthel & Barthel
Attorneys

UNITED STATES PATENT OFFICE.

ELIJAH McCOY, OF DETROIT, MICHIGAN, ASSIGNOR TO PENBERTHY INJECTOR CO., OF DETROIT, MICHIGAN, A CORPORATION OF MICHIGAN.

LUBRICATOR.

No. 890,295.  Specification of Letters Patent.  Patented June 9, 1908.

Application filed March 11, 1907. Serial No. 361,643.

*To all whom it may concern:*

Be it known that I, ELIJAH McCOY, a citizen of the United States of America, residing at Detroit, in the county of Wayne and State of Michigan, have invented certain new and useful Improvements in Lubricators, of which the following is a specification, reference being had therein to the accompanying drawings.

This invention relates to improvements in lubricators for supplying oil to cylinders and other parts which are filled with a fluid under pressure and which class of lubricators are provided with a passage to permit the fluid to enter the oil cup of the lubricator and put a pressure upon the oil therein so that a portion of the oil will be introduced into the cylinder at each stroke of the piston.

The object of this invention is to provide a lubricator of this class having a drop nipple extending downward into a sight-feed chamber and provided with a separate passage for conducting the pressure fluid to the oil cup, which passage is so arranged in relation to the sight-feed and the oil discharge duct leading therefrom that the dropping of the oil will be accelerated rather than retarded by the ingoing pressure fluid and the drop will remain intact in falling to the bottom of the chamber, thus preventing the clouding of the glasses with oil by the breaking up and diffusion of the drops.

To this end the invention consists in the construction and arrangement of parts as hereinafter more fully described and particularly pointed out in the claims, reference being had to the accompanying drawing, in which:—

Figure 1:
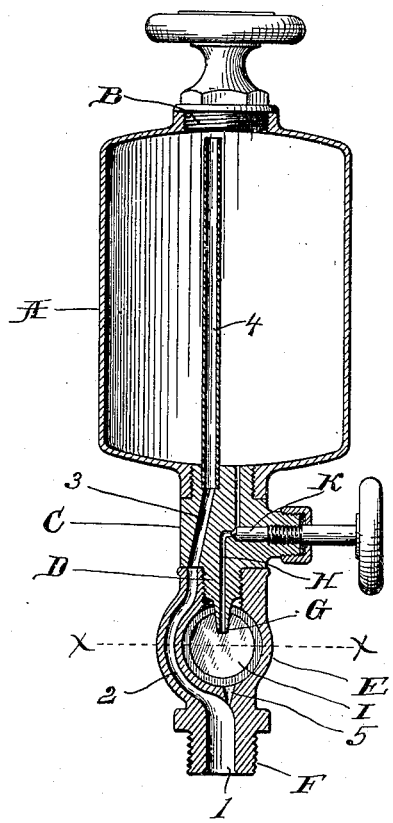
Figure 2:
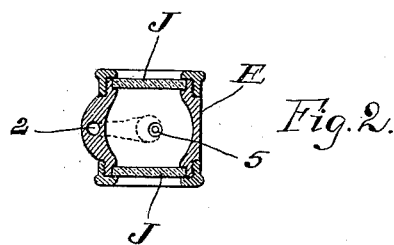

Figure 1 is a transverse vertical section of a lubricator embodying the invention; and Fig. 2 a horizontal section of the same on the line *x*—*x* of Fig. 1.

A is a suitable cylindrical oil cup or receptacle having a fill-opening at its top, closed by a screw plug B and a screw-threaded opening in its bottom into which is screwed a fitting C having a downwardly extending externally screw-threaded stud D to engage a screw-threaded bore in the upper end of a sight fitting E which is provided with an externally screw-threaded shank F adapted to be screwed into an opening in a cylinder or other device to be lubricated.

The stud D of the fitting C is formed with a downwardly extending drop nipple G and a small oil passage H extends upward through this nipple and fitting and opens into the oil cup, to conduct the oil into the oil chamber I of the sight fitting, which chamber is closed at its ends by the glasses J held therein by suitable rings in the usual manner.

The flow of oil through the passage H is controlled by a valve K having a screw stem extending through a screw-threaded opening in a boss on the fitting and provided with a hand wheel by means of which it may be turned, all as ordinarily constructed.

The shank F of the sight fitting is formed with an axial bore 1 which, just below the chamber I turns laterally and tapers into a continuation 2 of said passage of smaller diameter, formed in the fitting at one side of said chamber and extending upward through the fitting to meet the lower end of a similar passage 3 in the fitting C and into the upper end of which passage 3 a tube 4 is secured having its upper open end adjacent to the top of the oil chamber, the tube and parts 3, 2 and 1 of the passage, thus forming a continuous channel around the sight chamber to conduct the pressure fluid from the cylinder to which the lubricator is attached, into the upper end of the oil cup above the oil.

The wall separating the sight chamber I from the upper curved end of the lower part 1 of the passage, is pierced by a small duct 5 to permit the oil dropping from the nipple G to escape from the chamber into the passage and flow downward therethrough to the part to be lubricated. This duct 5 is preferably made of larger diameter at its upper end where it opens into the chamber than at its lower end where it opens into the passage, so that the oil will pass into and through it more readily in feeding and also so that more oil will be contained therein to more effectually seal the duct when the fluid under pressure rushes up the passage.

The duct opening through the curved wall of the passage being very small and to one side of the passage, the pressure fluid will not enter the sight chamber through said duct but will be deflected from the mouth of said duct by the inclination of the passage and pass upward through the free and unobstructed passage around said chamber; and the duct being very small in diameter, the drops of oil contained therein also tend to prevent the pressure fluid from passing therethrough into said chamber. By thus preventing the blasts of fluid under high pressure from entering the sight chamber the drops of oil issuing from the nipple are prevented from being broken up and diffused through the chamber, and the glasses clouded thereby, thus enabling the operator to see exactly the amount of oil being fed.

The wall separating the chamber and passage is thin and therefore the duct may be made small in diameter without danger of clogging, because of its short length.

Having thus fully described my invention, what I claim is:—

1. In a lubricator, the combination with an oil receptacle, of a fitting upon which it is mounted, the fitting provided with a pressure passage and with an oil duct terminating in a nipple at the lower end of the fitting, a tube in the pressure passage extending upward in the receptacle, a sight fitting secured to the lower end of the other fitting and provided with a sight chamber into which the nipple projects, and with a curved pressure passage opening into the end of the pressure passage in the fitting above and extending around at one side of the sight chamber, said sight fitting provided with a shank having an axial passage which is curved laterally and reduced in diameter at its upper end to meet the lower end of and form a part of the pressure passage in the fitting, and with an oil duct for the discharge of oil from the said sight chamber, said duct having a contracted lower end opening through the curved wall on the upper end of the enlarged part of the pressure passage in the shank of the sight fitting.

2. In a lubricator, the combination with an oil receptacle, of a fitting upon which it is mounted, the fitting provided with a pressure passage and with an oil duct terminating in a nipple at the lower end of the fitting, a tube in the pressure passage extending upward in the receptacle, a sight fitting provided with a sight chamber secured to the lower end of the other fitting with said nipple extending downward in the chamber, and also formed with a curved pressure passage opening into the end of the pressure passage in the fitting above and extending around at one side of the sight chamber, said sight fitting provided at its lower end with a shank having an axial passage which is curved laterally and reduced in diameter at its upper end to meet the lower end of and form a part of the pressure passage in the fitting and with an oil duct opening through the wall of the passage in said shank.

In testimony whereof I affix my signature in pressence of two witnesses.

ELIJAH McCOY.

Witnesses:
OTTO F. BARTHEL,
ANNA M. DORR.